G. MAYERLE.
TRIAL FRAME AND FACE GAGE.
APPLICATION FILED JUNE 20, 1911.
1,052,161.
Patented Feb. 4, 1913.
2 SHEETS—SHEET 1.
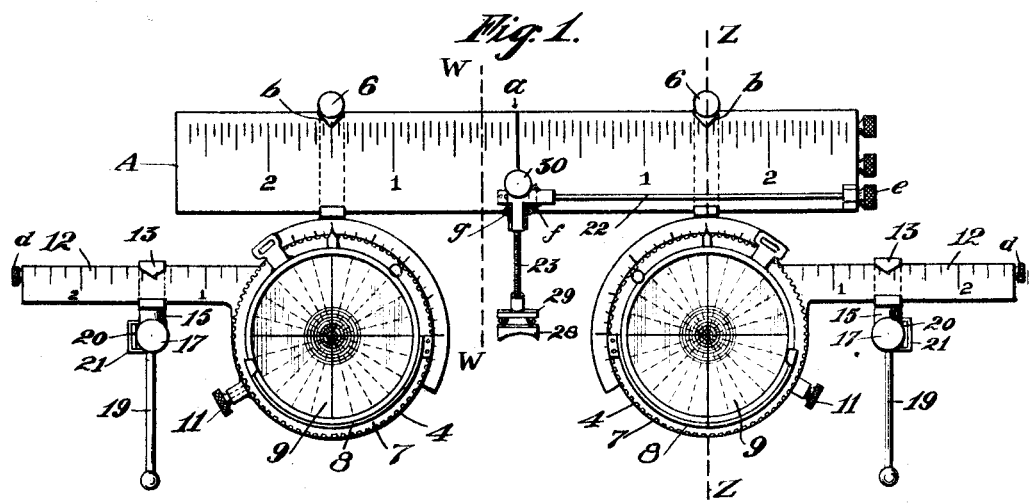
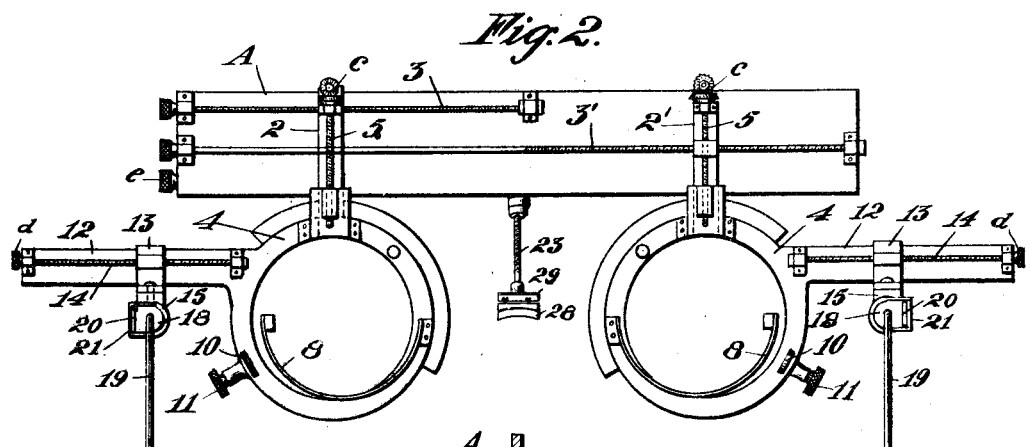
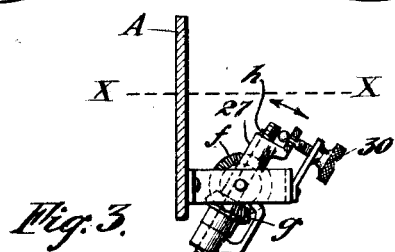
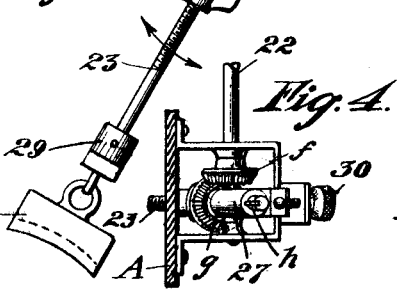
Witnesses:
Inventor:
George Mayerle
By G. H. Strong
His Atty

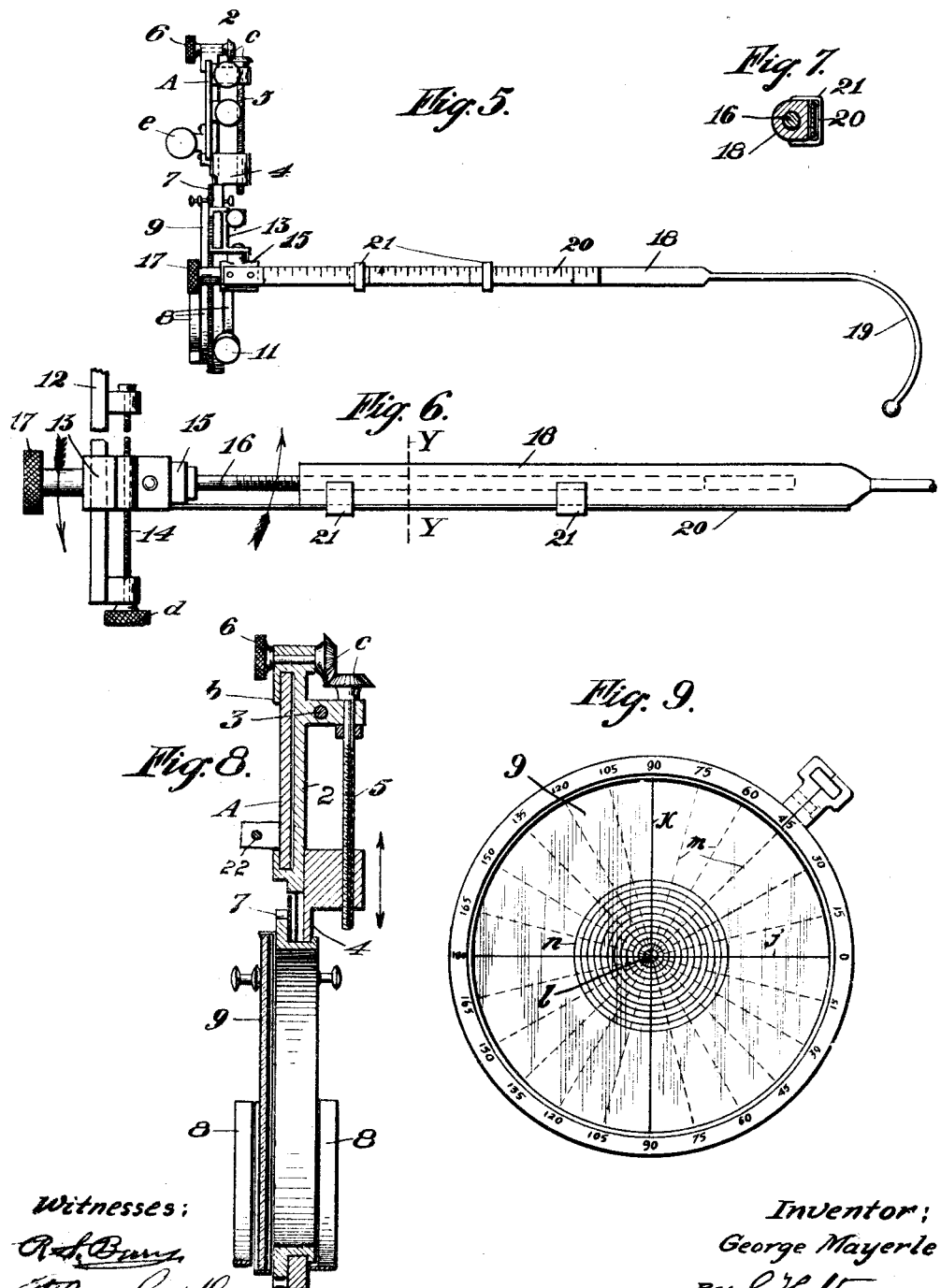

UNITED STATES PATENT OFFICE.

GEORGE MAYERLE, OF SAN FRANCISCO, CALIFORNIA.

TRIAL-FRAME AND FACE-GAGE.

1,052,161.  Specification of Letters Patent.  Patented Feb. 4, 1913.

Application filed June 20, 1911. Serial No. 634,328.

*To all whom it may concern:*

Be it known that I, GEORGE MAYERLE, citizen of the United States, residing in the city and county of San Francisco and State of California, have invented new and useful Improvements in Trial-Frames and Face-Gages, of which the following is a specification.

This invention relates to ocular-deviometers and particularly pertains to a combined gage and trial frame for oculists', optometrists' and opticians' use.

It is the object of this invention to provide a device by means of which the exact location of the pupilary centers of the eyes may be determined in relation to certain vertical and horizontal planes; and by means of which the position of the center of the pupil of each eye may be ascertained separately and independently of each other.

Another object is to provide a device embodying the above named features with a gage for determining the width between the temples, or the distance from the center of the crest of the nose to each temple, and the length of the temples independent of each other.

Another object is to provide a device for determining the asymmetrical position of each eye in relation to the crest of the nose, and at the same time ascertain the exact diameter of the pupil when in a maximum or minimum dilated or contracted state.

A further object is to provide a device of the above character, which is compact, simple in construction, easily adjusted, and which is so arranged that the several gages therein may be set so as to be read after the various adjustments have been made, thereby enabling the operator to construct eyeglasses and frames according to the particular requirements of the patient.

Other objects will become apparent in the following description.

The invention consists of the parts and the construction and combination of parts, as hereinafter more fully described and claimed, having reference to the accompanying drawings, in which—

Figure 1 is a front elevation of the invention. Fig. 2 is a rear view of same with the transparent plates removed. Fig. 3 is an enlarged section on the line W—W, Fig. 1, showing the carriage and the mechanism for adjusting same. Fig. 4 is a plan view taken on the line X—X, Fig. 3. Fig. 5 is an end view of the invention. Fig. 6 is an enlarged detail in plan of the temple-measuring device. Fig. 7 is a cross section on the line Y—Y, Fig. 6. Fig. 8 is an enlarged section on the line Z—Z, Fig. 1. Fig. 9 is a detail in front elevation of the pupil-gaging transparent plate.

In the drawings A represents a plate or frame of any suitable description, the outer face of which is graduated in opposite directions on each side of the longitudinal center $a$ thereof, and is divided in inches and fractions thereof, as shown in Fig. 1, or by any other suitable system of linear measurement.

Slidably mounted on the plate A are a pair of carriages 2—2', which are disposed on the frame A on each side of the longitudinal center $a$ thereof. These carriages have pointers $b$ formed thereon which extend over the graduated face of the plate A and indicate the distances the frames 2—2' are spaced from the longitudinal center $a$ of the plate A.

Means are provided for moving the carriages 2—2' longitudinally on the plate A, independent of each other. The carriage moving means consists of a pair of threaded shafts 3—3' mounted on the rear of the plate A and extending longitudinally thereof, as shown in Fig. 2, also extending through correspondingly threaded members on the carriages 2—2' in such manner that when either shaft 3 or 3' is rotated, the corresponding carriage 2—2' will be moved longitudinally on the plate A in either direction, as desired. Thumb pieces are formed on the shafts 3—3' to admit of their being easily turned in their bearings.

On each of the carriages 2—2' is a vertically adjustable transparent plate-carrying frame 4, each of which is adapted to be reciprocated on its respective carriage by means of a threaded stem 5, screw-connected to the frame 4 and revolubly mounted in suitable bearings on the carriages 2—2', as shown in Fig. 8; the stem 5 being rotated through beveled gears 6 by means of a thumb-nut 6 in such manner as to cause the frame 4 to move upwardly and downwardly on the stem 5 and thereby change its vertical position on the carriage. Mounted in each frame is a revoluble transparent plate-holder 7, having spring clamps 8 on the face thereof for securely retaining a transparent plate 9, shown in detail, Fig. 9, thereon. The transparent plate-holder 7 is rotated in the frame 4 by means of a gear 10 mounted in the frame 4 and rotated by means of a thumb-nut 11, which gear engages teeth formed on the periphery of the transparent plate-holder 7.

Formed on each frame 4 is a horizontally disposed bracket 12 which is graduated on its outer face in inches and fractions thereof, or in other system of linear measurement, to indicate distances from the vertical diameter of the transparent plate 9, which corresponds to the center of the carriage 2—2' represented by the pointer b. Mounted on the brackets 12 are slidable blocks 13 which are adapted to be moved to and fro on the brackets 12 by means of threaded shafts 14, which shafts are mounted on the brackets 12 and are screw-connected to the block 13, as shown in Fig. 2. By turning a thumb-nut d on a shaft 14 the block 13 thereon will be caused to travel and assume any desired position on the bracket 12.

Pivotally mounted on the block 13 is a pivoted bearing 15 which supports a horizontally disposed shaft 16, which shaft has a thumb-nut 17 on its outer end and is threaded on its inner end. This end extends some distance beyond the bearing 15 and enters an internally threaded tube 18 on the outer end of which is formed an ear engaging hook 19.

Rigidly mounted on one side of the bearing 15 and extending parallel with the shaft 16 and tube 18 is a flat plate 20, which plate is graduated in inches, or other system of linear measures, on its outer face and passes through bands or straps 21 on the tube 18. The connection between the tube 18 and the plate 20 is such as to prevent the tube 18 being rotated when the shaft 16 is revolved, but will cause it to travel back and forth on the shaft 16. The pivotal mounting of the bearing 15 admits of the shaft 16 and the tube 18 thereon being folded against the back of the transparent plate-carrying frame 4, when the device is not in use, so as not to take up much space.

Mounted on the face of the plate A is a revoluble shaft 22 provided with a thumb piece e on its outer end and a beveled gear f on its inner end; the gear f meshing with a gear g which is screwed on a threaded stem 23. The stem 23 is supported in a bearing 27 and is prevented from rotating thereon by means of a key or feather h on the bearing which engages a longitudinal groove in the stem 23. The gear g is held against longitudinal movement on the stem 23 by means of a yoke formed on the bearing 27. It will be seen that by rotating the shaft 22, the stem 23 will be caused to travel back and forth in the bearing 27 so as to advance or retract a nose-rest 28 which is rigidly mounted on a cross-head 29 formed on the lower end of the stem 23. The bearing 27 is pivotally mounted on the face of the plate A, so that the direction in which the stem 23 extends may be adjusted at various angles, the pivotal mounting of the bearing 27 corresponding to the axis of the shaft 22; the axis of the stem 23 corresponding to the center a of the plate A. The adjustment of the bearing 27 is accomplished by means of a thumb-screw 30 which is threaded in a bracket on the plate A, and is connected to the bearing 27 by means of a ball and socket joint in such manner that by screwing the thumb-screw 30 the bearing 27 will be rocked on its pivot into any desired position and securely retained therein.

The transparent plate 9 is provided with peculiar markings to adapt it to the particular uses to which it is put; the markings being clearly illustrated in the enlarged view thereof, shown in Fig. 9, and which consist of a horizontal and a vertical line j and k respectively, which cross each other at the center l of the transparent plate. These lines are given a prominent color, such as red. Intermediate of the lines j and k are a series of radiating lines m which indicate degrees of deviation and are colored green to form a contrast with the lines j and k, the purpose of the radiating lines, m, being to enable the operator to determine the degree or angle of deviation of the pupil of the eye in relation to the horizontal and vertical lines, j and k respectively. This is done by adjusting one transparent plate holder, 7, so that the center, l, will register with the pupil of the eye therebehind, and then setting the other transparent plate holder in a corresponding position in relation to the center, a, of the plate, A, with the horizontal lines, j and k on the two plates, 9, on the same plane. Any deviation of the pupil of the eye behind this second plate, 9, can be then readily determined and the degree of deviation noted. A series of concentric circles n, colored white, are arranged on the lens with the point of intersection l of the lines j k and m as their center, to determine the size of the pupil in a state of dilation or contraction. The concentric lines n are made white to contrast with the black pupil of the eye, the lines k and j are made red and the lines m are made green so as to contrast with the iris of the eye, as these colors are not found in the human eye; the lines m contrasting with the circles n and the lines k and j so as to be readily distinguished therefrom and not confuse the operator.

In the application of the invention, the plate A is placed adjacent to the forehead of a patient above the eyebrows, and the nose-rest 28 is adjusted by means of the thumb-nut e and thumb screw 30 so as to comfortably rest upon the bridge of the nose. The carriages 2—2' are then adjusted separately by means of the shafts 3—3' so as to dispose the vertical line k on the lens 9 in alinement with the pupilary center of each eye; the patient previously focusing the eye on a given point. By this action the distance of the pupilary center of each eye from the crest of the nose, corresponding to the center a of the plate A, is given in linear measurement and which is indicated by the pointers b. As the center of the pupils may be disposed above or below the horizontal line j on the lens 9, the latter are adjusted vertically by means of the thumb-nuts 6, so as to bring the center l of the transparent plate in such position as to register with the centers of the pupils. This being done, the extent of dilation or contraction of the pupils may be determined through the medium of the concentric circles n on the transparent plate. The distance between the crest of the nose and the temples is then determined by adjusting the blocks 13 on the arms 12 by means of the shafts 14 so as to bring the blocks in alinement with the temples. The measurement indicated on the arms 12 will give the distance from the center of the nose to the temples. The length of the temples is then ascertained by adjusting the tubes 18 on the shafts 16, by operating the thumb-nuts 17; the hook 19 engaging the ears and the forward strap 21 indicating the length of the temples on the scale or plate 20. This being accomplished, the device will rest in a correct position on the nose, whereupon the transparent plate 9 may be removed and other transparent plates for determining abnormal conditions of the eyes may be inserted in the frame in lieu thereof, as is well known in the science of optics, thus adapting the device for use as a trial frame.

From the foregoing it will be seen that the exact location of the center of each pupil separately in relation to the bridge of the nose may be accurately determined by the use of this invention, also that the width between the temples may be correctly ascertained. It will also be observed that measurements may be taken separately on each side of the nose by separate manipulation of the carriages 2—2'. This admits of measurements being taken where irregularities and deformities of the features exist, and insures accuracy in the construction of eyeglass frames and transparent plates.

Having thus described my invention, what I claim and desire to secure by Letters Patent is—

1. A trial frame and face gage, comprising a scale, a pair of frames carrying transparent plates, said frames being slidably mounted on the scale, means for moving said frames longitudinally on said scale independent of each other, and means for adjusting the frames in a vertical direction, said transparent plates being removably mounted in the frames and having lines radiating from the center thereof and concentric circles formed on the face thereof.

2. A trial frame and face gage, comprising a scale, a pair of frames carrying transparent plates, said frames being slidably mounted on the scale, means for moving said frames longitudinally on said scale independent of each other, means for adjusting the frames in a vertical direction, said plates being removably mounted in the frames and having lines radiating from the center thereof and concentric circles formed on the face thereof, a bracket on each of said frames having graduations thereon, blocks slidable in said brackets, and means for adjusting said blocks in various positions on said brackets.

3. A trial frame and face gage, comprising a scale, a pair of frames carrying transparent plates, said frames being slidably mounted on the scale, means for moving said frames longitudinally on said scale independent of each other, means for adjusting the frames in a vertical direction, said plates being removably mounted in the frames and having lines radiating from the center thereof and concentric circles formed on the face thereof, a bracket on each of said frames having graduations thereon, blocks slidable in said brackets, means for adjusting said blocks in various positions on said brackets, a pivoted bearing carried by each of said blocks, a threaded shaft in each of said bearings, a scale on each bearing parallel with said shaft, and a tube slidable on said scale and engaged by said threaded shaft.

4. A trial frame and face gage, comprising a scale, a pair of frames carrying transparent plates, said frames being slidably mounted on the scale, means for moving said frames longitudinally on said scale independent of each other, means for adjusting the frames in a vertical direction, said plates being removably mounted in said frames and having lines radiating from the center thereof and concentric circles formed on the face thereof, a bracket on each of said frames having graduations thereon, blocks slidable in said brackets, means for adjusting said blocks in various positions on said brackets, a pivoted bearing carried by each of said blocks, a threaded shaft on each of said bearings, a scale on each bearing parallel with said shaft, a tube slidable on said scale and engaged by said threaded shaft, and means for adjusting the first-named scale to the bridge of the nose.

5. A trial frame and face gage, comprising a scale, a pair of frames carrying transparent plates, said frames being slidably mounted on the scale, means for moving said frames longitudinally on said scale independent of each other, means for adjusting the frames in a vertical direction, said plates being removably mounted in said frames and having lines radiating from the center thereof and concentric circles formed on the face thereof, a bracket on each of said frames having graduations thereon, blocks slidable in said brackets, means for adjusting said blocks in various positions on said brackets, a pivoted bearing carried by each of said blocks, a threaded shaft on each of said bearings, a scale on each bearing parallel with said shaft, a tube slidable on said scale and engaged by said threaded shaft, means for adjusting the first named scale to the bridge of the nose, including a pivoted nose-rest, a threaded stem on which the nose-rest is mounted, means for reciprocating said stem, and separate means for oscillating said stem.

6. A trial frame and face gage comprising a transparent plate having a series of radial lines, and a series of concentric circles formed thereon.

7. A trial frame and face gage, comprising a transparent plate having a series of radial lines, and a series of concentric circles formed thereon, said lines and circles being of contrasting colors.

8. A trial frame and face gage comprising a transparent plate having a series of radial lines, and a series of concentric circles formed thereon, said lines and circles being of contrasting colors, and certain of the lines contrasting in color to other of said lines.

9. In an ocular-deviometer, an adjustable nose rest comprising a threaded stem, a pivoted bearing in which said stem is slidable, a nut on said stem, gear teeth on said nut, means engaging said gear teeth for moving the stem longitudinally, and means for rocking the pivoted bearing and retaining it in a fixed position.

10. In a trial frame and face gage, a temple measuring gage comprising a pivoted bearing, a threaded shaft thereon, a scale mounted thereon, and a tube on said shaft slidably connected to said scale and adapted to be reciprocated by rotating said shaft.

11. In a trial frame and face gage, a temple measuring gage comprising a pivoted bearing, a threaded shaft thereon, a scale mounted thereon, and a tube on said shaft slidably connected to said scale and adapted to be reciprocated by rotating said shaft, a block on which said bearing is mounted, a bracket on which said block is slidable, and means for adjusting the position of said block.

In testimony whereof I have hereunto set my hand in the presence of two subscribing witnesses.

GEORGE MAYERLE.

Witnesses:
LELAND E. KILBORN,
HAROLD R. GILBERT.